Feb. 13, 1923.

R. H. DAVIS 1,444,780

VALVE OF COMPRESSED GAS CONTAINERS

Filed Sept. 3, 1921

Inventor:
Robert Henry Davis
by Louis Trevost Whitaker
Atty.

Patented Feb. 13, 1923.

1,444,780

UNITED STATES PATENT OFFICE.

ROBERT HENRY DAVIS, OF LONDON, ENGLAND.

VALVE OF COMPRESSED-GAS CONTAINERS.

Application filed September 3 1921. Serial No. 498,364.

*To all whom it may concern:*

Be it known that I, ROBERT HENRY DAVIS, a subject of the King of Great Britain, residing at 187, Westminster Bridge Road, London, England, have invented new and useful Improvements in or Connected with the Valves of Compressed Gas Containers, of which the following is a specification.

This invention relates to the valves of compressed gas containers such as the main controlling valves of oxygen cylinders as used in connection with the breathing apparatus employed for mine rescue and other purposes. The invention consists broadly in the provision of means for locking the said valves, against accidental displacement, in any position to which they may be adjusted.

According to one embodiment of the invention the valve hand-wheel is formed with a number of holes arranged around the circumference of a circle concentric with the axis of the said wheel and with any one of which, depending upon the position to which the wheel has been adjusted, there can engage a bolt mounted in the valve casing beneath the said wheel. The bolt is retained in a guide in which it can slide axially in a direction, parallel to the axis of the valve spindle and it is furnished with a spring which normally tends to hold it in engagement with the handwheel, with a finger-piece by means of which it can be disengaged from the said wheel and with means by which it can be retained in the operative position.

To enable the invention to be fully understood, I will describe it by reference to the accompanying drawing, in which:—

Figure 1:
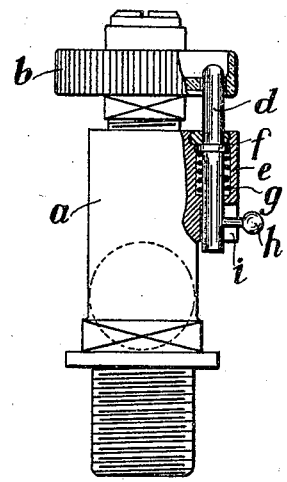
Figure 3:
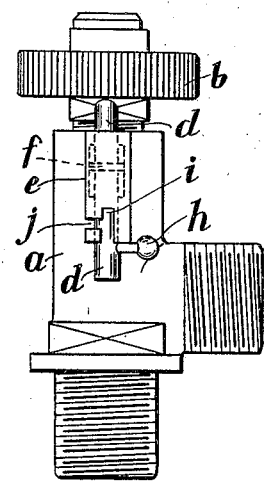
Figure 2:
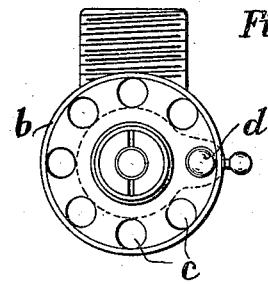

Figure 1 is an elevation, partly in section, of a complete valve having the locking device applied thereto, Figure 2 is a plan view thereof, and Figure 3 is an elevation of the valve at right angles to Figure 1.

*a* indicates the valve casing and *b* the valve hand-wheel. *c* indicates the series of holes formed in the said hand-wheel and arranged around the circumference of a circle concentric with the valve spindle axis, as shewn in Figure 2. *d* is the locking bolt, which is mounted in the guide *e* preferably formed integral with the valve casing *a*. The bolt *d* is provided, at that part which is within the guide *e*, with a shoulder or collar *f* and against the underside of this collar there bears one end of a spiral spring *g*, which is coiled around the bolt and the other end of which contacts with the bottom of the guide *e*.

The bolt *d* extends completely through the guide *e* and its lower projecting end is provided with the finger-piece *h*, which, when the bolt is in the locking position, enters a slot *i* in the lower part of the guide *e*, as shewn in Figure 1. When the bolt is withdrawn from engagement with the hand-wheel *b* the finger-piece is free from the slot *i* and can be turned into the position shewn in Figure 3 in which it bears against the underside of the guide *e* and thus secures the locking bolt *d* in the inoperative position.

As will be understood, the device operates as follows: Assuming that the bolt is in the disengaged position shewn in Figure 3, the hand-wheel *b* is adjusted to the required position in which one of the holes *c* is in axial alignment with the bolt *d*. The latter is then turned by means of the finger-piece *h* until the latter can enter the slot *i* in the guide *e*, and the bolt pushed into engagement in the aforesaid hole *c* in which it is retained by the spiral spring *g*, thereby securely locking the hand-wheel against accidental displacement as shewn in Figures 1 and 2. To release the hand-wheel to permit of the further adjustment of the valve it is merely necessary to pull down the bolt *d* by means of the finger-piece *h* and to turn the latter into the position shown in Figure 3.

The bolt *d* may be locked in its upper position by turning the finger-piece *h* into engagement with a notch *j* in the guide *e*.

Claims:

1. In a valve, the combination with the valve casing, and valve hand wheel, of a spring actuated locking bolt, slidably mounted on one of said parts, the other of said parts being provided with a curved row of apertures arranged concentrically with respect to the axis of the hand wheel to receive said bolt, a finger piece for moving said bolt longitudinally, and a shoulder adapted to be engaged by the finger piece to hold the bolt at one extreme of movement.

2. In a valve, the combination with the valve casing, and valve hand wheel, of a spring actuated locking bolt, slidably mounted on one of said parts, the other of said parts being provided with a curved row of apertures arranged concentrically with respect to the axis of the hand wheel to receive said bolt, a finger piece for moving said bolt longitudinally and shoulders in position to engage said finger piece when the bolt is rotated, to lock the bolt in inoperative and in operative position.

3. The combination with a valve having a hand wheel provided with a series of holes of a spring bolt slidably mounted in a guide on the valve casing and adapted to engage any one of said series of holes in the valve hand-wheel and of means such as a finger-piece for manipulating the said bolt and locking it in the operative position, substantially as hereinbefore described.

ROBERT HENRY DAVIS.